United States Patent [19]

Yaros

[11] 4,197,756
[45] Apr. 15, 1980

[54] METHOD OF MAKING A PULLEY

[75] Inventor: Anthony P. Yaros, Pinconning, Mich.

[73] Assignee: Peters Manufacturing Company, Inc., Kawkawlin, Mich.

[21] Appl. No.: 900,342

[22] Filed: Apr. 27, 1978

Related U.S. Application Data

[63] Continuation-in-part of Ser. No. 723,572, Sep. 15, 1976, Pat. No. 4,098,137.

[51] Int. Cl.² .................. F16H 55/36; F16H 55/44
[52] U.S. Cl. .................. 74/230.3; 29/159 R; 74/230.8; 74/230.14
[58] Field of Search .......... 29/159 R; 74/230.8, 74/230.3, 230.14

[56] References Cited

U.S. PATENT DOCUMENTS

| | | | |
|---|---|---|---|
| 1,634,438 | 7/1927 | Spreen | 74/230.8 X |
| 1,742,484 | 1/1930 | Nelson | 29/159 R |
| 2,152,684 | 4/1939 | Grange et al. | 29/159 R |
| 2,242,716 | 5/1941 | Woodward | 74/230.8 |
| 2,493,053 | 1/1950 | Zatyko | 74/230.8 X |
| 2,685,801 | 8/1954 | Tishman | 74/230.5 |
| 2,905,004 | 9/1959 | Rose | 29/159 R X |
| 2,915,908 | 12/1959 | Warnkey | 29/159 R |
| 2,929,345 | 3/1960 | Zatyko, Sr. | 72/378 |
| 3,962,926 | 6/1976 | Kotlar | 29/159 R |
| 3,977,264 | 8/1976 | Sproul | 29/159 R |

FOREIGN PATENT DOCUMENTS

| | | | |
|---|---|---|---|
| 724816 | 7/1942 | Fed. Rep. of Germany | 29/159 R |
| 529187 | 11/1940 | United Kingdom | 74/230.8 |

*Primary Examiner*—Leslie Braun
*Attorney, Agent, or Firm*—John J. Swartz

[57] ABSTRACT

A pulley including a cup-shaped hub having a cylindrical sidewall provided with a radially extending annular, multiple wall thickness fold at the axially inner end thereof, a radially outwardly flaring belt retaining flange at the axially outer end thereof, and a belt retaining ring mounted on said sidewall adjacent, and projecting radially outwardly beyond, the fold. One aspect of the invention comprises the method of making the pulley including the step of mounting the belt retaining ring prior to the step of forming the axially inner, multiple wall thickness fold.

3 Claims, 25 Drawing Figures

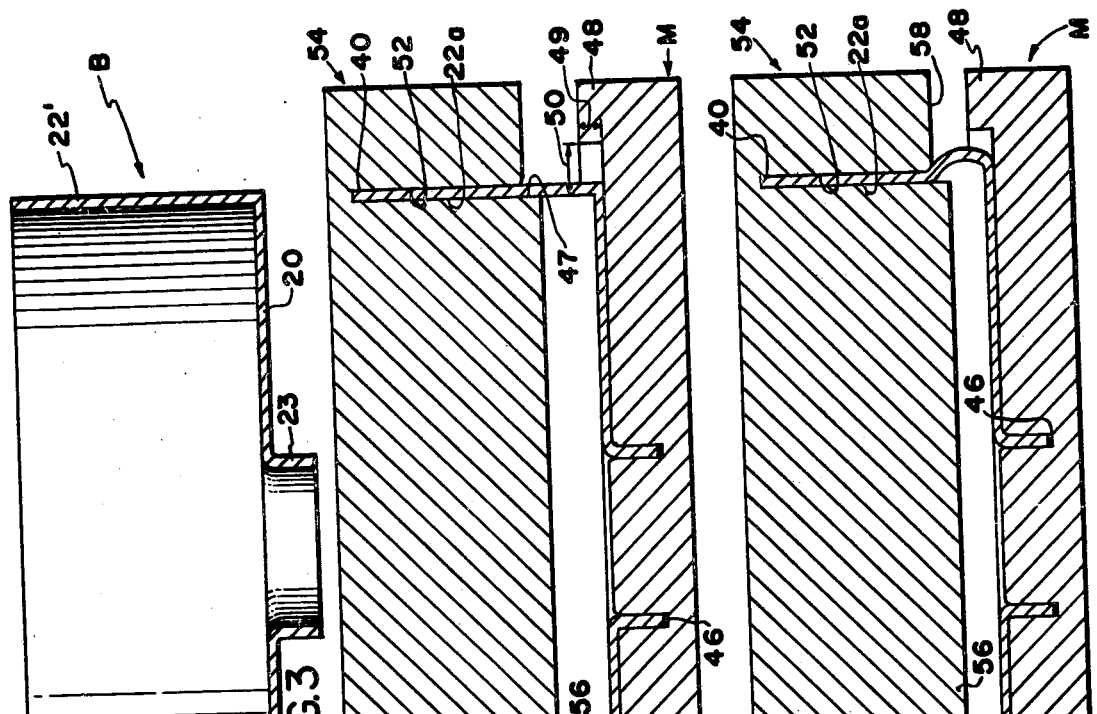

4,197,756

METHOD OF MAKING A PULLEY

BACKGROUND OF THE INVENTION

This application is a continuation-in-part application of U.S. application, Ser. No. 723,572, filed in the U.S. Patent Office on Sept. 15, 1976, now U.S. Pat. No. 4,098,137, entitled Pulley and Method of Making Same, which application is incorporated herein by reference as though fully set forth herein.

This invention relates to a multi-groove pulley and method of making same.

An internal combustion engine installed in an automobile conventionally mounts various automotive accessories such as an electrical generator, water cooling fan, a water pump and an air conditioning unit. The accessories are driven via a plurality of axially spaced, endless drive belts trained around a multi-groove pulley, which is mounted on an engine drive shaft, and a plurality of pulleys mounted on the drive shafts of the various accessories. One endless drive belt may, for example, be trained around a sheave portion of a multi-groove drive pulley and a driven pulley mounted on the drive shaft of an electrical generator. Another endless belt may be trained around an axially spaced sheave portion of a multi-groove drive pulley, an idler pulley, and a driven pulley mounted on the drive shaft of a fan or a power steering unit.

With the advent of petroleum shortages, it is particularly important that the gross weight of automobiles be minimized so that the fuel consumption rate is decreased. It is important therefor, that the gross belt-weight and the gross pulley-weight of automobile engines be minimized. Some prior art belt drive pulleys have been cast or manufactured from machined bar stock and are relatively heavy and expensive to manufacture. The pulley constructed according to the present invention is lightweight and particularly adapted for use with a single, endless, multi-pyramid, drive belt which replaces the plurality of individual belts utilized heretofore on automobile internal combustion engines.

Pulleys constructed according to the present invention can be substituted for the internal combustion engine drive pulley, the idler pulleys or any or all of the plurality of driven pulleys of all of the automobile accessories. An internal combustion engine employing a multi-pyramid, serpentine belt will mount all of the pulleys in one vertical plane and the endless multi-pyramid belt will be trained therearound. Accordingly, it is an object of the present invention to provide a new and useful, light weight, multi-groove pulley for an endless multi-pyramid belt.

It is another object of the present invention to provide a new and novel method of inexpensively manufacturing a light-weight pulley.

It is another object of the present invention to provide a pulley and method of making same which will minimize pulley eccentricity.

Yet another object of the present invention is to provide a multi-groove pulley having a one-piece cup-shaped mounting member mounting a multi-groove, belt receiving cylinder.

A further object of the present invention is to provide a pulley and method of making a pulley having a cup-shaped mounting member provided with an annular, axially disposed multi-wall thickness, retaining flange at the axially inner end and an annular, radially outwardly flaring opposed, belt retaining flange at the axially outer end.

Still another object of the present invention is to provide a method of making a pulley including the step of mounting an annular belt retaining ring axially inward of a terminal, radially outwardly flaring belt, axially outer retaining flange and then radially outwardly bulging and folding an axially inner, annular portion of a sidewall of a cup-shaped member to axially retain the belt retaining ring.

A still further object of the present invention is to provide a method of making a pulley for a multi-pyramid belt including the steps of mounting a hollow, cylindrical, belt receiving member on the cylindrical sidewall of a cup-shaped member, and thereafter mounting an annular belt retaining ring on the axially inner end portion of the sidewall in bearing engagement with the inner end face of the cylindrical, belt receiving member, and then outwardly bulging an axially inner portion of a cylindrical sidewall of a cup-shaped member, to form an axially inner retaining flange.

Other objects and advantages of the present invention will become apparent to those of ordinary skill in the art as the description thereof proceeds.

SUMMARY OF THE INVENTION

A pulley including a hollow, cup-shaped mounting member having a radially extending endwall rotatable about an axis and an axially extending sidewall having, at its axially outer end, a radially outwardly flaring annular retaining flange and a multi-groove, belt receiving cylinder mounted on the sidewall in abutting relation with the axially outer end flange. An annular belt retaining ring is mounted on the sidewall in abutting relation with the axially inner end of the belt receiving cylinder. The sidewall includes an integral, radially outwardly extending, multi-wall thickness fold for axially securing the retaining ring. The pulley is manufactured by initially mounting a belt receiving sheave on the sidewall, in abutting relation with the axially outer flange, mounting an annular belt retaining ring on the sidewall in abutting relation with the inner end of the sheave, and thereafter forming the multi-wall thickness annular flange on the inner end of the sidewall in abutting relation with the belt retaining member.

The present invention may more readily be described and understood by reference to the accompanying drawings in which:

FIG. 1 is a sectional, side elevational view illustrating a pulley constructed according to the present invention;

FIG. 3 is a sectional, side elevational view illustrating a cup-shaped metal blank at the commencement of manufacture;

FIGS. 4–11 illustrate successive steps in the process of making the pulley illustrated in FIGS. 1 and 2;

DESCRIPTION OF THE PREFERRED EMBODIMENT

Figure 6:
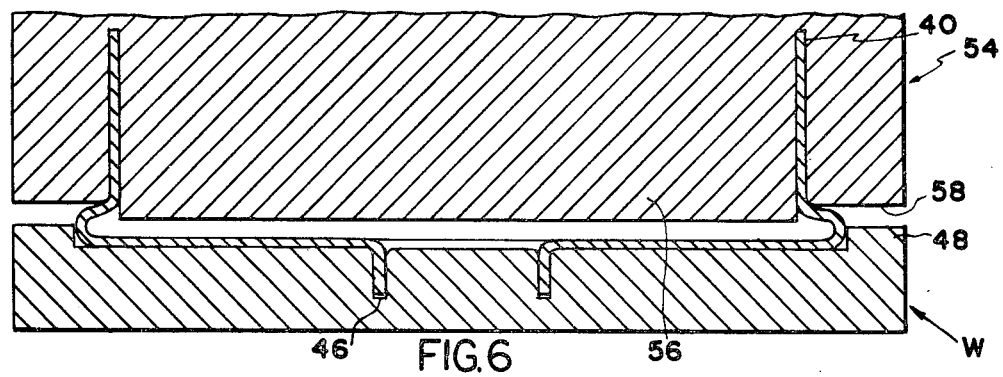

A pulley constructed according to the present invention is particularly adapted for use with an endless, serpentine belt, generally designated 10, having a smooth exterior surface 11 and an inner surface provided with a plurality of generally V-shaped, parallel, circumferentially extending, pyramids 12 separated by a plurality of circumferentially extending grooves 14. The axial width of the belt 10 is substantially greater than the radial thickness thereof so that the belt can conform to the curvature of a relatively small diameter pulley. The belt 10 may comprise a combination of materials including rubber, nylon, and suitable reinforcing members. The belt 10 replaces a plurality of endless drive belts (not shown) conventionally utilized to couple the drive shaft of an internal combustion engine to various automotive accessories such as an electrical generator, an air blowing fan, an air conditioning unit and a power steering unit. For a belt of a given axial width, the plurality of circumferentially extending pyramids 12 provide a greatly increased bearing surface and thus substantially increases the torque which can be transmitted via the multi-pyramid belt 10 compared to a belt which does not include the pyramids 12.

A multi-groove pulley constructed according to the present invention is generally designated 16 and includes a generally hollow, cup-shaped pressed metal body 18 having an endwall 20 and an axially extending, hollow cylindrical sidewall 22. The endwall 20 comprises a generally planar radially extending circular disc having a central, axially extending hollow neck 21 mounted on a central hub 24 which in turn is mounted on a rotatable shaft 25 that may comprise either a drive shaft or a driven shaft rotatable about an axis 27. The mounting neck is brazed or otherwise suitably fixed to the shaft 25.

The cup-shaped member 16 is one piece and comprises sheet steel. The sidewall 22 comprises a right circular, hollow cylinder having, at its axially inner end, a radially extending fold portion 30 folded over on itself to provide an axially inner, sheave tread retaining flange having an axial thickness equal to twice the wall thickness of the cup-shaped member 16. The double thickness fold 30 includes parallel flange portions 31 and 33 coupled by a web portion w. The flange portion 31 lies in the plane of the endwall 20.

Figure 2:
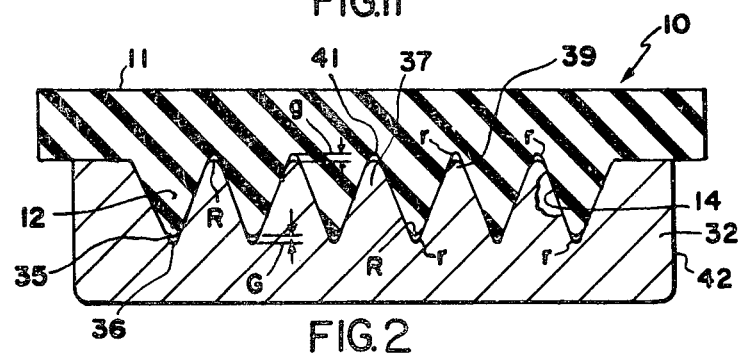
FIG. 2 is a greatly enlarged sectional view illustrating the belt and pulley sheave.
Figure 15:
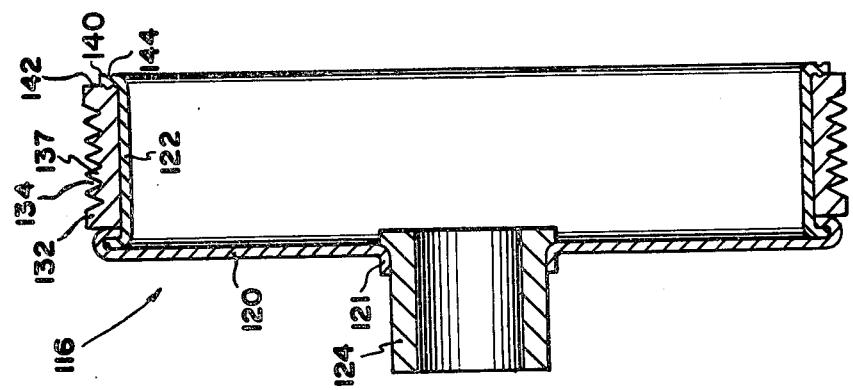
FIGS. 12–15 are sectional side views illustrating successive steps of making a slightly modified pulley construction.
Figure 14:
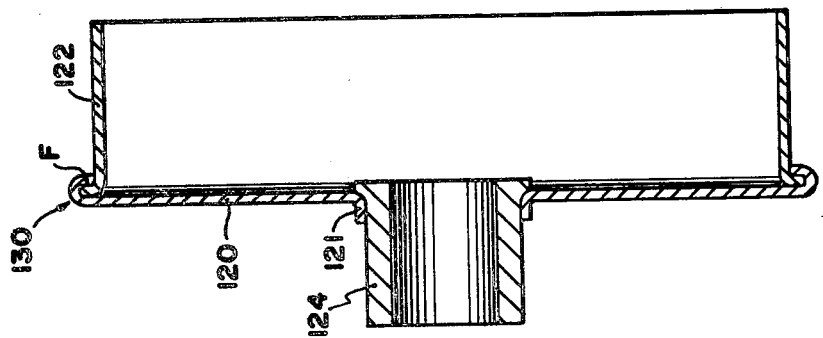

Mounted on the cylindrical sidewall 22 is a hollow, cylindrical sheave tread or belt receiving member 32 which may suitably comprise aluminum or steel or other composition material. The sheave tread 32 includes a plurality of V-shaped, circumferentially extending, generally parallel annular grooves 34 defining a plurality of inverted V-shaped, circumferentially extending, generally parallel, annular serrations, teeth or projections 37. The annular sheave tread grooves 34 receive the circumferentially extending belt pyramids 12. As illustrated in FIG. 2, the terminal ends 35 of the belt pyramids 12 are spaced from the roots 36 of the pulley grooves 34 by gaps G.

Similarly, the terminal ends 39 of the sheave tread projections or serrations 37 are spaced from the roots 41 of the belt grooves 14 by expansion gaps g equal in depth to the expansion gaps G. The gaps g and G permit relative expansion of the belt and sheave tread.

As illustrated in FIG. 2, the terminal ends 35 of the belt pyramids 12 have a radius of curvature R which is substantially greater than the radius of the curvature r of the roots 36 of the grooves 34. Similarly, the terminal ends 39 of the annular sheave tooth portions 37 between the grooves 34 have a radius of curvature R which is greater than the radius of curvature r of the roots 41 of V-slots 14 in the belt 10.

As illustrated in the drawings the radial thickness of the sheave tread pyramids 37 is substantially less than the overall radial thickness of the sheave tread 32.

The axially terminal end portion 40 of the mounting cup sidewall 22 is bent radially outwardly into a plane perpendicular to the axis 27 into abutting relation with the outer face 42 of the belt receiving sheave 32. The sheave tread 32 is thus tightly sandwiched between the parallel flanges 40 and 30. A plurality of circumferentially spaced locking dimples 44 are pressed in the annular flange 40 and axially outer face 42 of the sheave tread 32 to further inhibit relative rotation of the annular sheave 32 and the mounting hub 16.

Although the belt receiving grooves 34 are machined in the sheave tread cylinder 32, it should be understood that the sheave tread cylinder 32 could be cast or molded with the grooves 34 initially cast or molded therein.

METHOD OF MAKING

Referring now more particularly to FIGS. 3–11, a unitary piece of sheet metal is initially stamped or pressed in a two step operation to form a cylindrical, cup-shaped blank B having a base or endwall 20 and an integral cylindrical sidewall 22'. When the blank B is stamped, the hollow mounting neck 21 is formed therein. The cup-shaped blank B is placed into a lower die member M having a central, annular slot 46 for receiving the neck 21. The lower die includes an annular, confining ring 48 which receives the cup-shaped blank B having an axial depth 49 equal to the axial thickness of the double wall fold 30 of the finished workpiece. The annular flange retaining ring 48 is spaced from the cup-shaped member sidewall 22' by an annular gap 50.

Figure 7:
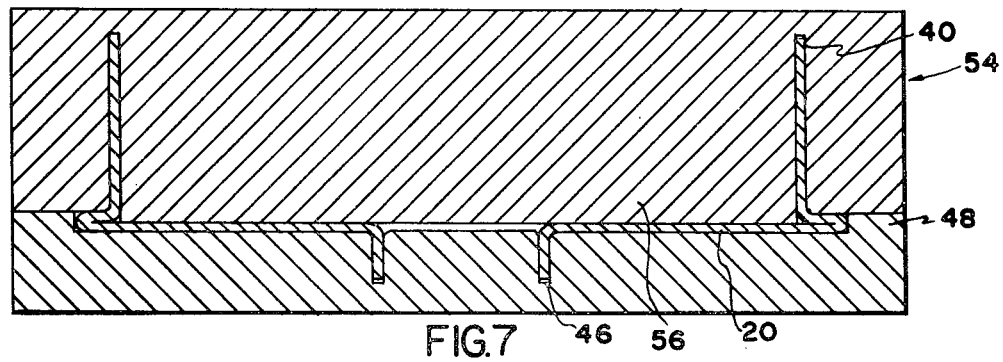

The terminal end 40 of the cup-sidewall 22' is received in an annular slot 52 provided in an upper press 54 which is vertically movable from the removed position illustrated in FIG. 4 to the closed position illustrated in FIG. 7. The upper press 54 includes a central boss 56 which projects slightly beyond the remaining lower face 58 of the press 54 and bears against the inner surface 22a of the cup shaped wall 22'. The central boss 56 radially supports a portion 57 of the sidewall 22 between the endwall 20 and the portion of the sidewall 22 received in the annular slot 52. The radial distance of the gap 50 between the inside of the annular retaining ring 48 and the outer surface 47 of the projecting boss 56 is equal to the radial height of the finished fold 30.

Figure 8:
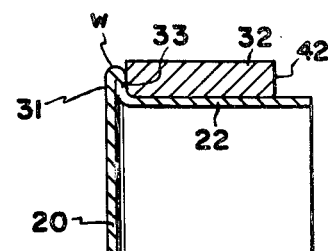
Figure 9:
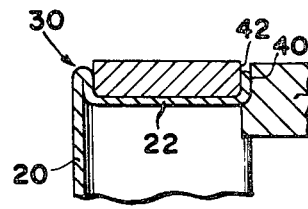
Figure 10:
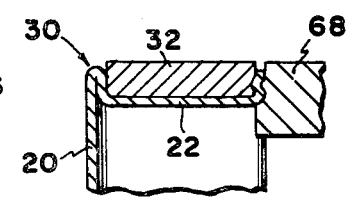
Figure 11:
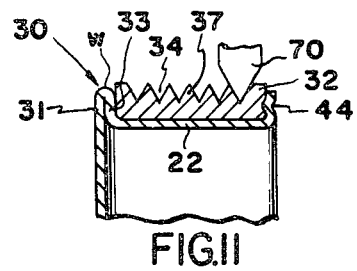

The press 54 is moved downwardly from the removed position illustrated in FIG. 4 to the position illustrated in FIG. 5 to exert an axial force on the terminal end 40 of the sidewall 22' in the direction of the arrow 60. The centrally disposed, wall supporting, upper press boss 56 radially internally supports the sidewall 22' such that when the axial force is exerted in the direction of the arrow 60, the portion 57 of the sidewall 22' inwardly of the surface 58 will bulge radially outwardly. As the upper press moves from the position shown in FIG. 4 to the position illustrated in FIG. 5, pressure is applied to opposite sides of the crown of the bulge to fold the metal flat upon itself in the manner illustrated. As the upper press 54 continues toward the lower mold M to the position illustrated in FIG. 6, the bulged portions 57 will collapse and be pressed together. The upper press 54 continues toward the lower die M and the double thickness wall fold 30 is formed at the end of the stroke of the upper press 54, the boss 56 will bear against the inside of the cup endwall 20. FIG. 8 shows the partially manufactured pulley in which the bulge 57 has been crimped together to form the double thickness wall flange 30 at the axially inner end of the finished sidewall 22.

The partially finished workpiece is then removed from the press 54 and the die M and a cylindrical belt receiving, sheave tread 34 is slid onto the cylindrical mounting wall 22 into abutting relation with the double fold flange 30. The reduced diameter neck 21 is mounted on the hub 24 which in turn is mounted on a rotatable mandrel 64. A flaring tool 66 (FIG. 9) is moved axially inwardly into engagement with the terminal end portion 40 of the wall 22 while the partially completed cup-shaped member 16 is rotated to progressively bend the terminal end 40 radially outwardly into a plane perpendicular to the axis 27 into abutting relation with the axially outer surface 42 of the sheave tread 34. A dimpling tool, schematically designated 68, then is moved into engagement with the end flange 40 for providing a plurality of circumferentially disposed indentations or locking dimples 44 which further prevent relative rotational movement of the sheave tread 32 and the mounting cup 16.

A machine tool 70 is provided for cutting a plurality of grooves 34 in the sheave tread 32 as the pulley hub 16 and the tread 32 are rotated.

As illustrated in the drawings, the inner diameters of the fold 30 and the outer flange 40 are equal. Because the grooves are machined in the sheave tread 32 after it is mounted on the wall 22, eccentricity is minimized. The hub 24 is removed from the mandrel and thereafter mounted on a rotatable shaft. The belt 10 is then trained around the pulley to transmit energy between the belt and the shaft.

ALTERNATE EMBODIMENT

Figure 12:
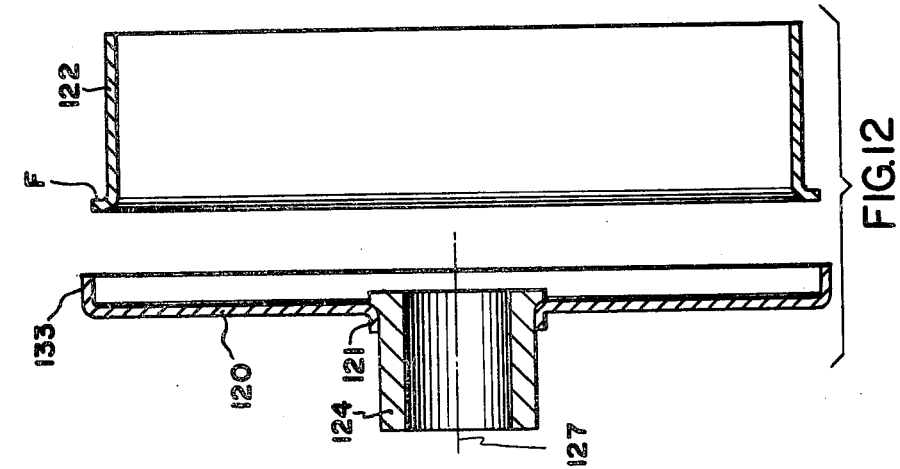
Figure 18:
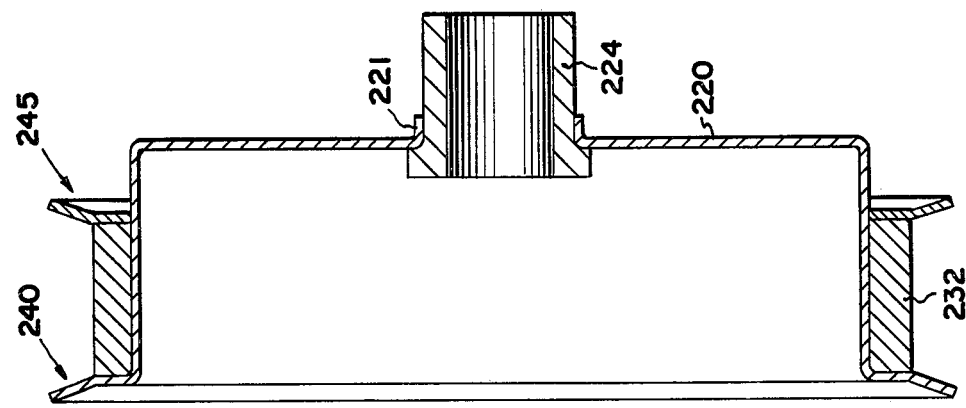
FIGS. 18–25 illustrate successive steps in the process of making the pulley illustrated in FIG. 16.
Figure 17:
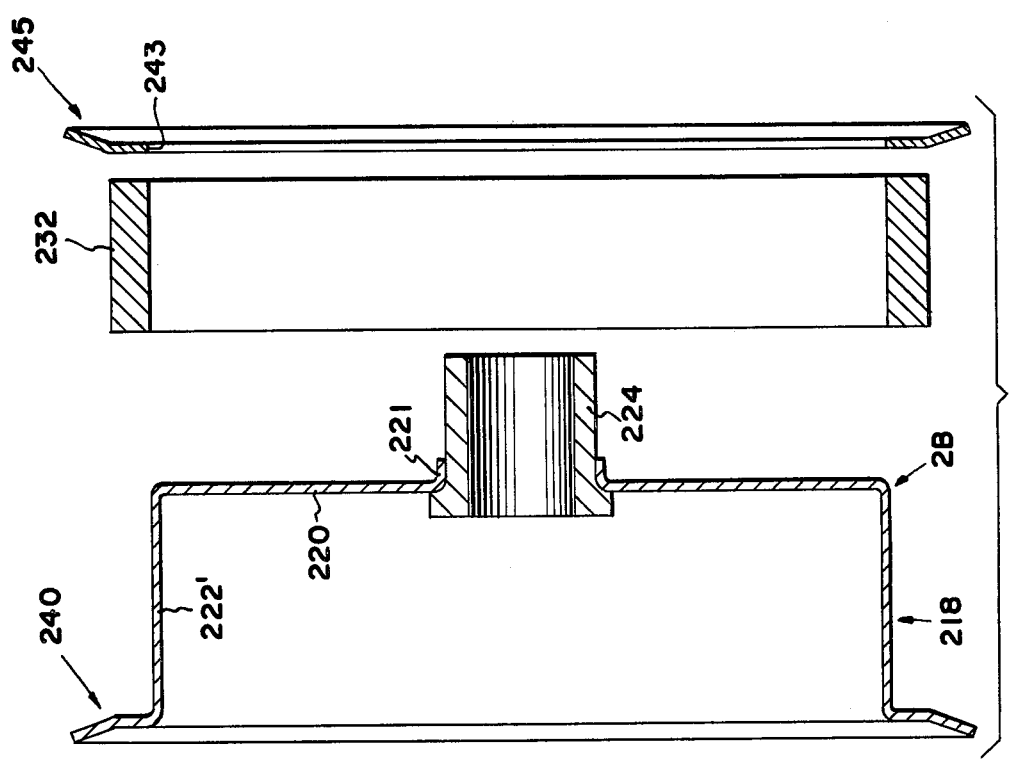
FIG. 17 is an exploded, sectional side elevational view illustrating a portion of the pulley illustrated in FIG. 16.
Figure 16:
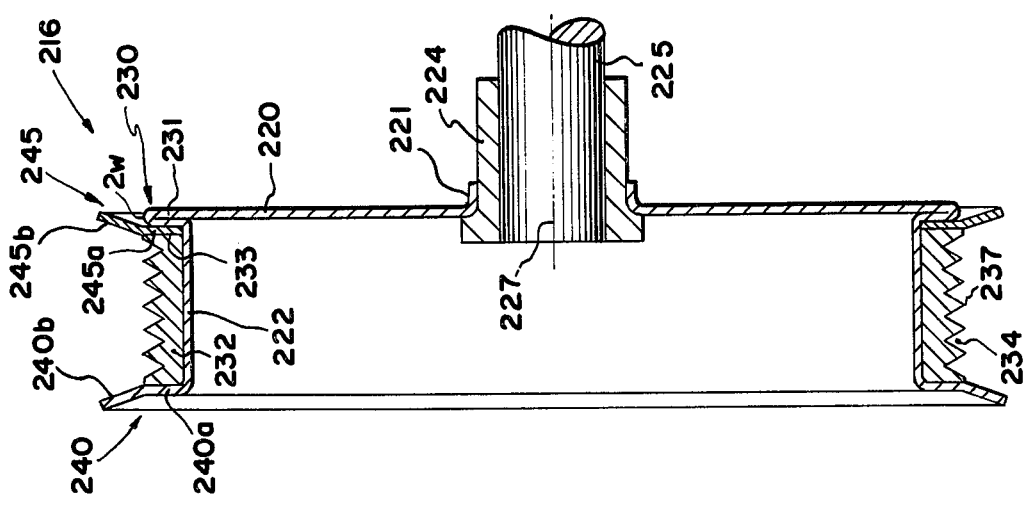
FIG. 16 is a sectional side elevational view illustrating yet another modified pulley construction.

Referring now more particularly to FIGS. 12-15, a pulley, generally designated 116, is disclosed and is generally similar to the pulley 16. Generally similar parts are identified by the same numeral preceeded by the prefix 1. The pulley 116 includes a generally planar, circular endwall 120 having a hollow neck 121 press fit on a central mounting hub 124. The endwall 120 includes a flange 133 which is initially, axially disposed as illustrated in FIG. 12.

Figure 13:
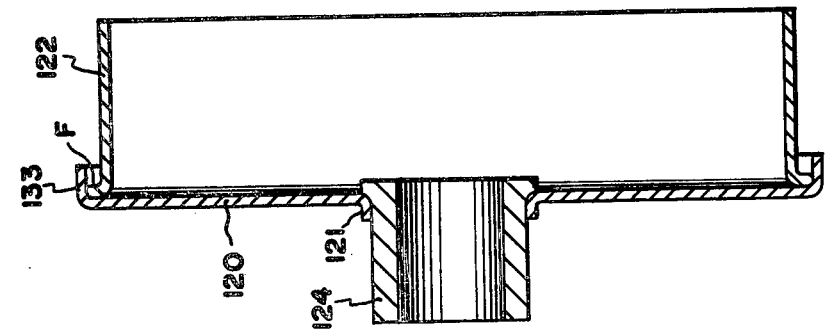

A generally, hollow, cylindrical, sidewall member 122 is provided and includes a rearwardly, outwardly flaring annular flange F which is disposed in abutting relation with the endwall 120 as illustrated in FIG. 13. The flange 133 is radially folded inwardly to the position illustrated in FIG. 14 on opposite sides of the flange F to secure the flange F. Endwall 120 and sidewall 122 may suitably comprise sheet steel.

Mounted on the cylindrical sidewall 122 is a hollow cylindrical sheave tread or belt receiving member 132 identical to the sheave tread 32 previously described. The axially terminal end portion 140 of the sidewall 122 is bent radially outwardly to the position illustrated in FIG. 15 after the sheave tread 132 is mounted on the sidewall 122. A plurality of circumferentially spaced locking dimples 144 are pressed in the annular flange 140 and axially outer face 142 of the sheave tread 132 to hold same in position.

IMPROVED PULLEY

Referring now more particularly to FIGS. 16-25, a pulley, generally designated 216, is disclosed and is generally similar to the pulley 16. Generally similar parts are identified by the same numeral preceded by the prefix 2. The pulley 216 includes a generally hollow, cup-shaped pressed metal body 218 (FIG. 17) having an endwall 220 and an axially extending, hollow, cylindrical sidewall 222. The endwall 220 comprises a generally planar, radially extending circular disc having a central, axially extending hollow neck 221 mounted on a central hub 224 which, in turn, is mounted on a rotatable shaft 225 (FIG. 16) that may comprise either a drive shaft or a driven shaft rotatable about an axis 227. The mounting neck 224 is brazed or otherwise suitably fixed to the shaft 225.

The cup-shaped member 218 is one piece and comprises sheet steel. The sidewall 222 comprises a right circular, hollow cylinder, having at its axially outer terminal end, a radially outwarding flaring flange 240 having a radially inner, sheave tread retaining portion 240a and radially outer, axially outwardly flaring belt retaining flange portion 240b.

Figure 25:
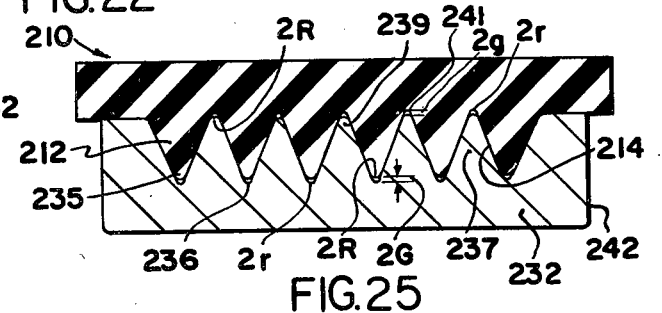

Mounted on the cylindrical sidewall 222 is a hollow, cylindrical sheave tread or belt receiving member 232 which may suitably comprise aluminum or steel. The sheave tread 232 includes a plurality of V-shaped, circumferentially extending, generally parallel annular grooves 234 defining a plurality of inverted V-shaped, circumferentially extending, generally parallel, annular serrations, teeth or projections 237. The annular sheave tread grooves 234 receive the circumferentially extending belt pyramids 212. As illustrated in FIG. 25, the terminal ends 235 of the belt pyramids 212 are spaced from the roots 236 of the pulley grooves 234 by gaps 2G.

The terminal ends 239 of the sheave tread projections or serrations 237 are spaced from the roots 241 of the belt grooves 214 by expansion gaps 2g equal in depth to the expansion gaps 2G. The gaps 2g and 2G permit relative expansion of the belt and sheave tread.

As illustrated in FIG. 25, the terminal ends 235 of the belt pyramids 212 have a radius of curvature 2R which is substantially greater than the radius of the curvature 2r of the roots 236 of the grooves 234. Similarly, the terminal ends 239 of the annular sheave tooth portions 237 between the grooves 234 have a radius of curvature 2R which is greater than the radius of curvature 2r of the roots 241 of V-slots 214 in the belt 210.

As illustrated in the drawings, the radial thickness of the sheave tread pyramids 237 is substantially less than the overall radial thickness of the sheave tread 232.

Mounted on the axially inner end of the sheave tread 232 is a belt retaining ring or washer, generally designated 245, including a radially inner, sheave retaining flange portion 245a, which lies in a plane perpendicular to the axis 227, and a radially outer, axially outwardly flaring belt retaining flange portion 245b which flares axailly outwardly in a direction opposite to the flaring of flange 240b. The flange 245 includes an axially extending opening 243 therethrough which receives the cup sidewall 222 and bears against the axially inner end of the sheave tread 232.

The axially inner end of the sidewall 222 includes a radially extending fold portion, generally designated 230, folded over on itself to provide an axially inner, sheave tread retaining flange having an axial thickness equal to twice the wall thickness of the cup-shaped member 216. The double thickness fold 230 includes parallel flange portions 231 and 233 coupled by a web portion 2w. The flange portion 231 lies in the plane of the endwall 220. The sheave tread 232 is less tightly sandwiched between the parallel flanges 240 and 230, with the belt retaining flange member 245 being sandwiched between the sheave tread 232 and the fold 230. A plurality of circumferentially spaced, locking dimples 244 are pressed in the internal diameter of the sleeve 222 and the inner diameter of the sheave 232 to further inhibit relative rotation of the annular sheave 232 and the mounting hub sidewall 222.

The outer flange portions 240b and 245b define a truncated, V-shaped slot for receiving the belt 210. Although the belt receiving grooves 234 are machined in the sheave tread cylinder 232, it should be understood that the sheave tread cylinder 232 could be cast or molded with the grooves 234 initially cast or molded therein.

IMPROVED METHOD OF MAKING

Referring now more particularly to FIGS. 17-25, a unitary piece of sheet metal is initially stamped or pressed to form a cylindrical, cup-shaped blank 2B having a base or endwall 220, an integral sidewall 222' having an integral, radially outwardly flaring sheave tread retaining and belt retaining flange 240. When the blank 2B is stamped, the hollow mounting neck 221 is formed therein. The reduced diameter neck 221 is mounted on a hub 224 and is fixed thereto via brazing or any other suitable coupling technique.

The sheave tread retaining and belt retaining sleeve 245 is axially slid onto the sidewall 222' into abutting relation with the end face 242 of the sheave 232.

The cup-shaped blank 2B mounting the sheave tread 232 and retaining sleeve 245 is placed into a slot 252 provided in a lower press or die member 254, including mountable, cooperating partible die portions 254a and 254b which define the slot 252 complemental to the shape of the sidewall 222' and terminal flange 240. The die portions 254a and 254b are initially parted to receive the terminal flange 240, sheave tread 232, retaining sleeve 245, and the end portion of sidewall 222. The dies are then closed to the positions illustrated in FIG. 19. The lower die 254 includes a central boss 256 which projects slightly beyond the remaining upper face 258 of the die 254 and bears against the inner surface 222a of the cup-shaped wall 222'. The central boss 256 radially supports a portion 257 of the sidewall 222 between the endwall 220 and the portion of the sidewall 222 received in the annular slot 252. The endwall 220 of the cup-shaped blank 2B is received by a cylindrical recess 251 provided in an upper die member 2M. An annular slot 246 is countersunk in the recess 251 for receiving the neck 221. The upper mold includes an annular, confining ring 248 which defines the cylindrical recess 251 and has an axial depth 249 equal to the axial thickness of the doublewall fold 230 of the finished workpiece. The annular flange retaining ring 248 is spaced from the cup-shaped sidewall 222' by an annular gap 250. The radial distance of the gap 250 between the inside of the annular retaining ring 245 and the outer surface 247 of the projecting boss 256 is equal to the radial height of the finished fold 230.

The axially inner, radially outer portion of the upper mold 2M includes beveled portions 253 which are shaped complemental to the shape of the outer flange portion 245b as illustrated.

Figure 19:
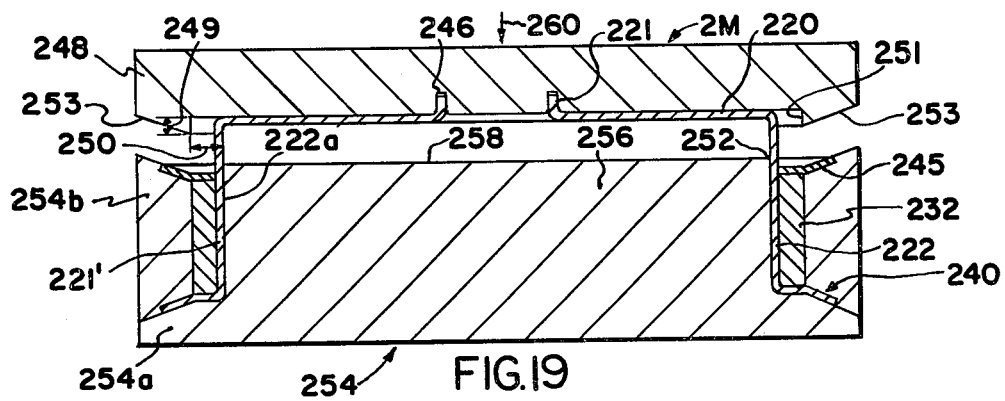
Figure 20:
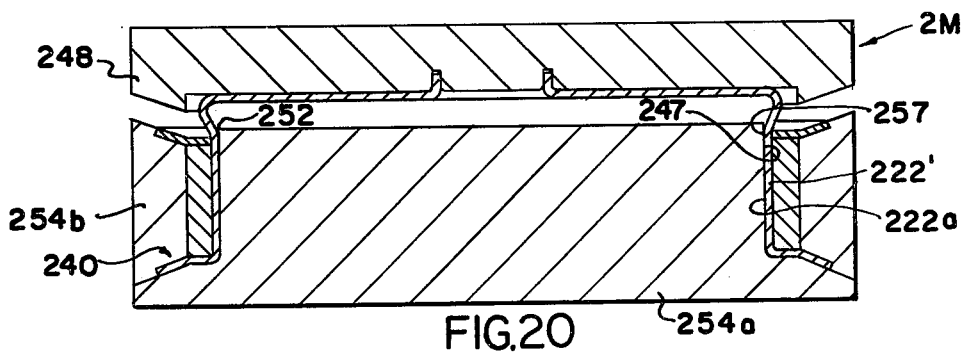
Figure 21:
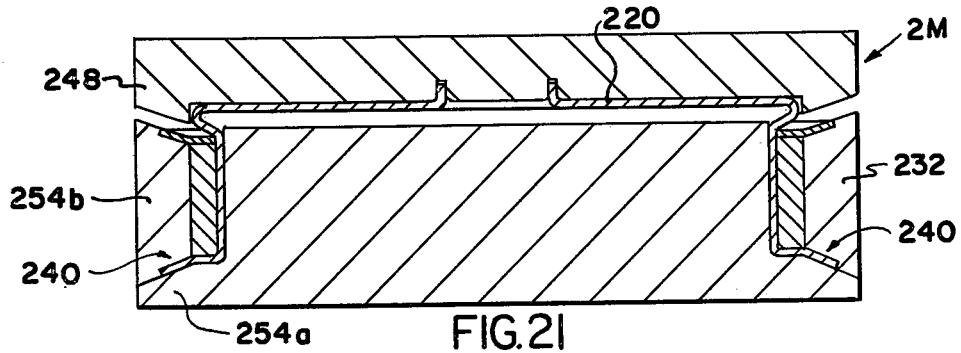
Figure 22:
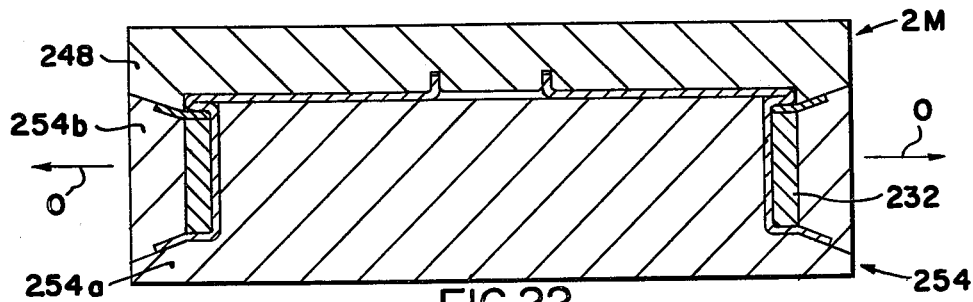
Figure 23:
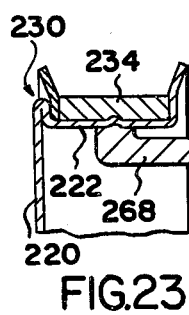
Figure 24:
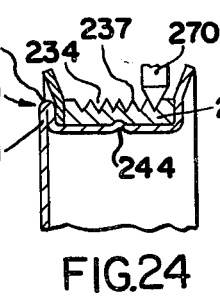

The upper press 2M and lower press 254 are relatively moved toward each other from the removed positions, illustrated in FIG. 19, to the more closed positions, illustrated in FIG. 20, to exert an axial force on the axially outer end 240 of the sidewall 220' in the direction of the arrow 260. The centrally disposed, wall supporting, lower press boss 256 radially internally supports the sidewall 222' such that when the axial forces exerted in the direction of the arrow 260, the portion 257 of the sidewall 222' inwardly of the surface 258 will bulge radially outwardly, as illustrated. As the upper and lower press members 2M and 254 continue to move toward each other, from the positions illustrated in FIG. 20 to the positions illustrated in FIG. 21, pressure is applied to opposite sides of the crown of the bulge to fold the metal flat upon itself in the manner illustrated. As the upper and lower press members 2M and 254 continue to move toward each other from the positions illustrated in FIG. 21 to the positions illustrated in FIG. 22, the bulged portions 257 will collapse and be pressed together. The double thickness wall fold 230 is formed at the end of the stroke of the relatively moving members. At this time, the boss 256 will bear against the inside of the cup endwall 20. The press members 2M and 254 are then relatively axially separated to separate the press members from the finish fold 230. The partible die segment 254b is then radially separated in the direction of the arrow O (FIG. 22) to release the sidewall 222' and terminal flange 240 which are axially removed from die segment 254a. The hub 224 is then mounted on a rotatable mandrel 225.

A dimpling tool, schematically designated 268, is then moved into engagement with the internal diameter surface 223 of the sidewall 222 for providing a plurality of circumferentially disposed, indentations or locking dimples 244 which bear against the internal diameter of the sheave 232 to prevent relative rotational movement of the sheave tread 232 and the mounting cup 216.

A machine tool 270 is provided for cutting a plurality of grooves 234 in the sheave tread 232 as the pulley hub 216 and the tread 232 are rotated.

As illustrated in the drawings, the inner diameter of the flange portions 240a and 245a are equal and the outer diameter of the belt retaining flange portion 240b is equal to the outer diameter of the belt retaining flange 245b.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A method of making a rotary pulley for transmitting rotative movement between a rotatable element and a belt with a one-piece, hollow cup-shaped blank having a radially extending endwall hub mounting a radially outer, axially extending sidewall comprising an axial outer terminal end portion including a radially outwardly projecting annular belt retaining flange, said method comprising the steps of:

mounting a hollow, belt receiving, cylinder on the outer peripheral surface of said sidewall by axially sliding said cylinder over said sidewall into abutting engagement with said axially outer flange;

thereafter mounting a hollow, radially outwardly projecting belt retaining annular member on said sidewall axially adjacent the axially inner end of said cylinder;

exerting axially compressive forces on said sidewall while radially supporting the terminal end portion of said sidewall to outwardly bulge an axially inner portion of said sidewall adjacent said endwall; and axially compressing the axially inner bulge portion to form a radially outwardly projecting, double wall thickness, annular retaining fold at the axially inner end of said sidewall;

said compressing step being accomplished by radially outwardly flaring the axially inner end of said sidewall into abutting engagement with the axially inner end face of said annular belt retaining annular member to secure said annular belt retaining member and said cylinder.

2. The method as set forth in claim 1 including the step of thereafter forming a plurality of parallel, belt receiving, annular grooves in the outer peripheral surface of said cylinder.

3. The method as set forth in claim 2 wherein the depth and width of each of said grooves is substantially less than the radial thickness and axial width, respectively, of said cylinder.

* * * * *